US007101655B1

(12) United States Patent
Alperovich et al.

(10) Patent No.: US 7,101,655 B1
(45) Date of Patent: *Sep. 5, 2006

(54) METHOD FOR INCREASING FLUORESCENT SIGNAL OF OPTICAL DISKS WITH FLUORESCENT READING AND RESULTANT DISCS

(75) Inventors: Mark Alperovich, Ashdod (IL); Irene Zuhl, Ashdod (IL); Eugene Levich, New York, NY (US); Arie Chaikin, Bolon (IL)

(73) Assignee: D Data Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/493,818

(22) Filed: Jan. 28, 2000

Related U.S. Application Data

(60) Provisional application No. 60/119,899, filed on Feb. 12, 1999.

(51) Int. Cl.
*G11B 7/24* (2006.01)

(52) U.S. Cl. .............. 430/270.15; 430/945; 430/270.2; 430/270.15; 430/270.16; 369/288; 428/64.8; 428/64.9

(58) Field of Classification Search ................ 430/945, 430/270, 15, 270.16, 270.19, 270.2; 369/288; 428/64.8, 64.9
See application file for complete search history.

(56) References Cited

U.S. PATENT DOCUMENTS

| | | | | |
|---|---|---|---|---|
| 4,752,554 A | * | 6/1988 | Sato et al. .................. 430/945 |
| 4,904,574 A | * | 2/1990 | Suzuki ................... 430/270.15 |
| 5,225,317 A | | 7/1993 | Yoshizawa ................... 430/945 |
| 5,227,495 A | * | 7/1993 | Inagaki et al. ........... 548/302.1 |
| 5,283,094 A | * | 2/1994 | Sasakawa et al. ........... 430/945 |
| 5,378,516 A | * | 1/1995 | Arahara ...................... 430/945 |
| 5,492,792 A | * | 2/1996 | Tamura et al. ......... 430/270.15 |
| 5,639,588 A | * | 6/1997 | Huh ..................... 430/270.15 |
| 6,682,799 B1 | * | 1/2004 | Alperovich et al. ....... 428/64.1 |
| 6,835,431 B1 | * | 12/2004 | Alperovich et al. ....... 428/64.1 |
| 2005/0013966 A1 | * | 1/2005 | Alperovich et al. ....... 428/64.4 |

FOREIGN PATENT DOCUMENTS

| | | |
|---|---|---|
| EP | 0 190 829 A2 | 8/1986 |
| JP | 2-308439 | 12/1990 |
| JP | 63-195838 | 8/1998 |
| WO | WO 96/37888 | 11/1996 |
| WO | WO 98/25268 | 6/1998 |
| WO | WO 99/24527 | 5/1999 |

OTHER PUBLICATIONS

The Merck Index, (10th Edition), pp. CI-51, CI-256, CI-118, CI-101 (1983).*
Catalog of Summews Laboratories, UV-60, undated.

* cited by examiner

*Primary Examiner*—Martin Angebrannt
(74) *Attorney, Agent, or Firm*—Winston & Strawn LLP

(57) ABSTRACT

A fluorescent composition for use with single-layer and multilayer optical discs for CD ROM, DVD and WORM type devices with fluorescent reading is disclosed. The composition comprises a fluorescent dye, film-forming polymer, plasticizer, surfactant and light stabilizer. A method of increasing fluorescent signal level from the optical discs both for single-layer and multilayer optical memory materials is also disclosed along with the resulting optical discs.

13 Claims, No Drawings

METHOD FOR INCREASING FLUORESCENT SIGNAL OF OPTICAL DISKS WITH FLUORESCENT READING AND RESULTANT DISCS

This application claims priority of provisional application Ser. No. 60/119,899 Filed Feb. 12, 1999.

FIELD OF THE INVENTION

The present Invention is in the field of materials for optical memory carriers with high optical memory density and reading by means of fluorescence, such as CD ROM and WORM discs, and three-dimensional optical memory systems.

BACKGROUND OF THE INVENTION

At present, digital data carriers with optical recording, storage and reading experience fast spreading. Usually, the data is recorded by local alteration of optical thickness or the active media reflection ratio, while reading takes place by phase or amplitude changes of the laser beam in the recorded spots.

The most cheap and absolute optical carriers are CD ROM and WORM discs. However, the capacity and signal/noise ratio of the existing optical discs is not high enough for the developed computers and videosystems of the new generation. Thus, there are intensive development of advanced optical memory systems with increased record density, high signal/noise ratio, increased storage and usage stability and low cost. The promising ways of increasing optical carrier capacity are:

- increased number of active bits per active layer due to reduced pit length and increased number of pits; and
- multilayer disc creation.

These ways were realized in the recently launched DVD standard, where pits are half in size, and the number of layers reaches 4—two from each side of the substrate. This allows reaching 25 GB capacity on disc.

At the same time, further increase of active layers on discs with reading by means of reflection causes a rapid rise in the system price and lowers the quality of recorded data reproduction. Thus, future increase of disc capacity is not possible. The patents JP 63,195,838 (12.08.1988) and JP 02,308,439 (21.12.1990) describe reading by means of fluorescence. The principle idea is that after recording the recorded spots are non-fluorescent, and the background is fluorescent. At reading, the relevant laser beam excites fluorescent light, which is registered on the detector.

The above patents describe single-layer optical discs with laser recording, i.e. of WORM type.

At the same time, the main advantage of fluorescent reading is its suitability for three-dimensional optical memory carriers, such as multilayer discs. [B. Glushko, V. Krugkin, E. Levich].

The principle construction of a multilayer optical disc with fluorescent reading is described in [B. Glushko, US Provisional Patent Application Aug. 5, 1997, N 25457].

Single-layer optical discs, where data is recorded in pits or spiral grooves filled with fluorescent material, are laminated on each other to form a multilayer system, where active layers containing fluorescent pits or grooves 0.5–1.0 μm in depth are separated by inactive intermediate layers of 20–50 μm in depth, that are transparent for the excitation laser wavelength and fluorescent light. Fluorescent media for a multilayer optical disc with fluorescent reading shall meet a range of requirements, the most important being:

1. Fluorescent media absorption range shall coincide with the reading laser wavelength.

2. Quantum yield of fluorescent media shall be the highest possible and shall stay the same during long-term storage and use.

3. Absorption and fluorescence ranges shall not overlap significantly so not to cause repeated absorption of fluorescent light.

4. Fluorescent composition shall not disperse the passing excitation radiation and fluorescent light.

5. Fluorescent light shall also coincide well with the matrix and shall not migrate from it.

6. Fluorescent composition shall fill the pits or grooves well and shall not tincture the space in between.

7. The solution used for filling pits or grooves shall not dissolve the substrate, carrying pits or grooves, or change their geometry and size.

8. Refraction ratio of the fluorescent composition shall be close to the one of the substrate, carrying pits or grooves.

9. Characteristics of the fluorescent composition shall not be effected by storage or use of a multilayer optical disc.

All these requirements make it a non-trivial task to solve. It is especially difficult to achieve high intensity of fluorescence from the active layer, if we consider it to be 100–500 nm thick, with the concentration of fluorescent dye equal to $3–20 \times 10^{-2}$ Mol per kg of polymer. At such concentrations, the intensity of fluorescence from most of the organic luminophores will be rapidly reduced or can disappear due to the formation of associated forms of the dye with sandwich structure in the polymer. Such forms are non-fluorescent and they extinguish fluorescence of monomeric forms of the dye. Ability of the dye to form dimers and other associates is connected to the composition and structure of the polymeric matrix, used plasticizers and other ingredients of the polymeric composition. However, such high concentrations of the dye ($3–20 \times 10^{-2}$ Mol/kg) nearly always cause formation of associates.

Recently the medias for high-density optical CD ROM and WORM discs with fluorescent reading, including multilayer discs, were described in [M. Alperovich, E. Levich, I. Zuhl, et al. US Provisional Patent Appl. N Fluorescent Composition for production of the optical memory discs of CD ROM type; M. Alperovich, E. Levich, I. Zuhl, et al. US Provisional Patent Appln. Organic dye-in-polymer (DIP) medium for WORM disks with fluorescent reading; M. Alperovich, E. Levich, I. Zuhl, et al. US Provisional Patent Appln. Optical recording medium for fluorescent WORM discs; M. Alperovich, E. Levich, I. Zuhl, et al. US Provisional Patent Appln. Optical recording medium for fluorescent WORM disk including penetrated ion pairs in organic dyes].

The proposed fluorescent compositions were used for production of CD ROM and WORM discs with fluorescent reading, including multilayer structures. The recorded digital data was read on special drives, providing registration of the fluorescent signal. At the same time, further increase of fluorescence intensity from active layers of the optical discs is needed to increase stability and quality of the read data, to simplify the construction and to lower cost of production of the reading devices for fluorescent discs. This will also allow increasing the number of active layers on multilayer discs, thus increasing the optical memory capacity.

SUMMARY OF THE INVENTION

Taking the above into consideration, the purpose of this Invention is the development of methods of increasing fluorescent signal levels from the optical discs with fluorescent reading to obtain optical memory with high capacity.

The other purpose of the present Invention is the development of methods of increasing fluorescent signal levels from the optical discs with fluorescent reading to achieve higher stability and reproduction quality, simplify the construction and to lower cost of the device for reading fluorescent signals from optical discs.

The further purpose of this Invention is the development of methods of increasing fluorescent signal levels from the optical discs with fluorescent reading both for single-layer and multilayer optical memory materials with high capacity and high contrast.

According to the purpose of the present Invention, the above method of increasing the fluorescent signal from optical discs with fluorescent reading assumes use in the fluorescent composition of high-molecular compounds, plasticizers and other ingredients, which prevent formation of non-fluorescent dimers and other dye associates in the active media.

According to the other purpose of the present Invention, the above method of increasing the fluorescent signal from optical discs assumes use of a primer between the substrate and the active layer to preserve the pits or grooves on the substrate from aggressive effect of solvents, containing the fluorescent composition.

According to the further purpose of the present Invention, the above method of increasing the fluorescent signal from optical discs assumes using in the polymer compositions of active layers the additives that improve adhesion of the active layers to the substrate or the primer. According to the further purpose of the present Invention, the above method of increasing the fluorescent signal from optical discs assumes using in the substrate or primer substances, which provide effective absorption of non-fluorescent dimers and other associates of ionic pairs of cationic dyes in the active layer on the boundary between the substrate or the primer with the active layer.

DETAILED DESCRIPTION OF THE PREFERRED EMBODIMENTS

Below is the detailed description of the most preferred embodiments of the purposes of the present Invention.

First, we shall consider the variant, when the substrate—a transparent disc from polycarbonate (PC) or polymethyl methacrylate (PMMA) with pits or grooves 0.1–0.5 µm deep—is covered with a primer, which is later covered with an active layer, containing at least a fluorescent dye, film-making polymer, plasticizers and other ingredients, thereby preventing formation of non-fluorescent dimers and other associates of the dye, thus providing high fluorescence of the dye.

The primer is produced using different materials, which provide high adhesion to polycarbonate and polymethyl methacrylate substrates, and is evenly distributed upon the substrate, pits and grooves surface, thereby forming a film 10–100 nm thick, that is impermeable to the solvents and other ingredients of the active layer.

Good adhesion of the active layer to the primer shall also be provided. The materials, forming the primer, can be: liquid silica glass, Colcoat N-103× product by Colcoat Co., Ltd. (Japan), polyvinyl alcohol, heat treated after depositing on the substrate, thermosetting resins, including epoxy, phenol-, urea- and melamine-formaldehyde resins, polyorganosiloxanes, as well as latexes—divinyl styrene, divinylonitrile, styrene acrylate, alkyd, acrylate, etc. The fluorescent dye of the active layer with maximum absorption near the recording laser wavelength is chosen among the xanthene dyes of the eosine and rhodamine groups, acridine, oxazine, azine, perylene, violanthrole, cyanine, phthalocyanine dyes, indigoid colors and porphyrines.

The content of fluorescent dye in the layer is 0.1–10%.

The film-forming polymer can be chosen among a wide range of resins, for example: cellulose esters, such as nitrocellulose, cellulose acetate, cellulose acetate butyrate; cellulose ethers such as methyl cellulose, ethyl cellulose, butyl cellulose; vinyl resins such as polyvinyl acetate, polyvinyl butyral, polyvinyl acetal, polyvinyl alcohol and polyvinyl pyrrolidon; acrylic resins such as polymethylmethacrylate, polybutyl acrylate, polymethacrylic acid, polyacrylic amide and polyacrylonitrile; polyvinylchloride, and perchlorvinyl resin.

Film-forming properties of the used resins an the plasticity of the recording layer can be improved by adding to resins the proper plasticizer such as dibutyl phthalate, dioctyl phthalate or tricresyl phosphate.

To create a recording layer of the present Invention, the above-mentioned ingredients are dissolved in organic solvent or introduced in it as microcapsules less than 0.2 µm in size, prepared by known methods, further covering the substrate with this compound by spin coating, roller coating or dip coating.

The organic solvent is usually selected from alcohols, ketones, amides, sulfoxides, ethers, esters, halogenated aliphatic hydrocarbons or aromatic solvents. Examples of such solvents include methanol, ethanol, iso-propanol, iso-butanol, tetrafluoro-ethanol, diacetone alcohol, methyl cellosolve, ethyl cellosolve, acetone, methylethylketone, cyclohexanone, N,N-dimethhylformamide, N,N-dimethylacetamide, dimethylsulfoxide, tetrahydrofurane, dioxane, ethyl acetate, chloroform, methylene chloride, dichloroethane, toluene, xylene or their mixtures.

Various surface-active substances, such as butyl glycol, propylene glycol, dimethyl glycol, diethyl glycol, etc., improve adhesion of the active layers to the substrate or the primer, as well as heating the material at 100–120° C.

In another embodiment, the present Invention differs from the previous by embodiment in that the substrate is formed by a polymer that prevents formation of fluorescent dimers and other associates of the ionic pairs of cationic dyes on its boundary with the active layer, thus providing good adhesion of the active layer to the substrate. The substrate is covered with the active layer, containing a fluorescent dye, that is soluble in hydroxyl solvents of the film-forming polymer, a plasticizer and the additives, which improves adhesion of the active layer to the substrate.

Polyvinylchloride (PVC) and its co-polymers form the substrate.

The below examples illustrate this Invention, thus not limiting it.

EXAMPLE 1

The solution of 1% polyvinylacetate (PVA), 0.013% 3-diethylamino-7-diethylaminophenoxazonium perchlorate (Ox-1) and 0.2% dioctylphthalate in ethanol and ethyl cellusolve (1:1) was used for preparing the fluorescent composition. The solution was filtered and deposited on the substrate.

EXAMPLE 2

The solution of 1% polyvinylacetate (PVA), 0.039% 3-diethylamino-7-diethylaminophenoxazonium perchlorate (Ox-1) and 0.2% dioctylphthalate in ethanol and ethyl cellusolve (1:1) was used for preparing the fluorescent composition. The solution was filtered and deposited on the substrate.

EXAMPLE 3

The solution of 1% polyvinylacetate (PVA), 0.078% 3-diethylamino-7-diethylaminophenoxazonium perchlorate (Ox-1) and 0.2% dioctylphthalate in ethanol and ethyl cellusolve (1:1) was used for preparing the fluorescent composition. The solution was filtered and deposited on the substrate.

EXAMPLE 4

The solution of 1% nitrocellulose (NC), 0.013% 3-diethylamino-7-diethylaminophenoxazonium perchlorate (Ox-1) and 0.2% dioctylphthalate in ethanol and ethyl cellusolve (1:1) was used for preparing the fluorescent composition. The solution was filtered and deposited on the substrate.

EXAMPLE 5

The solution of 1% nitrocellulose (NC), 0.039% 3-diethylamino-7-diethylaminophenoxazonium perchlorate (Ox-1) and 0.2% dioctylphthalate in ethanol and ethyl cellusolve (1:1) was used for preparing the fluorescent composition. The solution was filtered and deposited on the substrate.

EXAMPLE 6

The solution of 1% nitrocellulose (NC), 0.078% 3-diethylamino-7-diethylaminophenoxazonium perchlorate (Ox-1) and 0.2% dioctylphthalate in ethanol and ethyl cellusolve (1:1) was used for preparing the fluorescent composition. The solution was filtered and deposited on the substrate.

EXAMPLE 7

The solution of 1% polyvinylacetate (PVA), 0.013% 1,1',3,3,3',3'-hexamethylindodicarbocyanine iodide (HIDC) and 0.2% dioctylphthalate in ethanol and ethyl cellusolve (1:1) was used for preparing the fluorescent composition. The solution was filtered and deposited on the substrate.

EXAMPLE 8

The solution of 1% polyvinylacetate (PVA), 0.039% 1,1',3,3,3',3'-hexamethylindodicarbocyanine iodide (HIDC) and 0.2% dioctylphthalate in ethanol and ethyl cellusolve (1:1) was used for preparing the fluorescent composition. The solution was filtered and deposited on the substrate.

EXAMPLE 9

The solution of 1% polyvinylacetate (PVA), 0.078% 1,1',3,3,3',3'-hexamethylindodicarbocyanine iodide (HIDC) and 0.2% dioctylphthalate in ethanol and ethyl cellusolve (1:1) was used for preparing the fluorescent composition. The solution was filtered and deposited on the substrate.

EXAMPLE 10

The solution of 1% nitrocellulose (NC), 0.013% 1,1',3,3,3',3'-hexamethylindodicarbocyanine iodide (HIDC) and 0.2% dioctylphthalate in ethanol and ethyl cellusolve (1:1) was used for preparing the fluorescent composition. The solution was filtered and deposited on the substrate.

EXAMPLE 11

The solution of 1% nitrocellulose (NC), 0.039% 1,1',3,3,3',3'-hexamethylindodicarbocyanine iodide (HIDC) and 0.2% dioctylphthalate in ethanol and ethyl cellusolve (1:1) was used for preparing the fluorescent composition. The solution was filtered and deposited on the substrate.

EXAMPLE 12

The solution of 1% polymethylmethacrylate (PMMA), 0.013% Oxazine 725 Perchlorate (Exciton, Inc.) (Ox-1) and 0.2% dioctylphthalate in methylene chloride and dioxane (1:4) was used for preparing the fluorescent composition. The solution was filtered, deposited on a polycarbonate disc with a liquid silica glass sub-layer and dried.

EXAMPLE 13

The solution of 1% chlorine polyyinylchloride (PCV), 0.013% Oxazine 725 Perchlorate (Exciton, Inc.) (Ox-1) and 0.2% dioctylphthalate in methylene chloride and dioxane (1:4) was used for preparing the fluorescent composition. The solution was filtered, deposited on a polycarbonate disc with a liquid silica glass sub-layer and dried.

Effect of Increasing of $I_n$ at Exchanging PVC for NC

TABLE #1

| Ex. # | | Dye concentration Mol/kg | Substrate type | Absorption | | | | Fluorescence | |
|---|---|---|---|---|---|---|---|---|---|
| | | | | $D_1$ | $D_2$ | $D_2/D_1$ | ½ | $\lambda_{flour,}$ (nm) | $I_{fl.}$ |
| 1. | OX1 + PVA | 0.03 | PC | 0.034 | 0.014 | 0.41 | 14.3 | 668 | 0.530 |
| 2. | OX1 + PVA | 0.09 | PC | 0.078 | 0.040 | 0.51 | 15.1 | 668 | 0.367 |
| 3. | OX1 + PVA | 0.018 | PC | 0.161 | 0.103 | 0.64 | 18.1 | 671 | 0.318 |
| 4. | OX1 + NC | 0.03 | PC | 0.057 | 0.021 | 0.37 | 15.0 | 675 | 0.991 |
| 5. | OX1 + NC | 0.09 | PC | 0.122 | 0.048 | 0.39 | 13.2 | 674 | 0.581 |
| 6. | OX1 + NC | 0.018 | PC | 0.241 | 0.112 | 0.46 | 14.6 | 667 | 0.748 |

NB: Thickness of fluorescent layer is 150 nm

Effect of Increasing of $I_n$ with Use of Primer

TABLE #2

| Ex. # | Dye concentration Mol/kg | Primer (liquid glass ~80 nm) | Substrate type | Absorption $D_1$ | $D_2$ | $D_2/D_1$ | ½ | Fluorescence $\lambda_{flour,}$ (nm) | Rel. $I_{fl.}$ | Fluor. layer thickness |
|---|---|---|---|---|---|---|---|---|---|---|
| 1. OX1 + PVA | 0.03 | − | PC | 0.034 | 0.014 | 0.41 | 14.3 | 668 | 0.530 | 150 |
| 1. OX1 + PVA | 0.03 | + | PC | 0.035 | 0.017 | 0.48 | 15 | 674 | 0.367 | 150 |
| 13. OX1 + PMMA | 0.03 | + | PC | 0.049 | 0.024 | 0.49 | 15.7 | 665 | 0.318 | 200 |
| 14. OX1 + PCV | 0.03 | + | PC | 0.017 | 0.005 | 0.29 | 11.8 | 664 | 0.991 | 50 |

Dependence of $I_n$ Level From the Polymer Substrate Nature

TABLE #3

| Substrate type/ Ex. #1 | Absorption $D_1$ | $D_2$ | $D_2/D_1$ | ½ | Fluorescence $\lambda_{flour,}$ (nm) | $I_{fl.}$ |
|---|---|---|---|---|---|---|
| Polypropylene | 0.024 | 0.013 | 0.54 | 15.0 | 668 | 0.177 |
| Polyester | 0.015 | 0.007 | 0.47 | 15.7 | 665 | 0.206 |
| Polycarbonate | 0.031 | 0.014 | 0.46 | 14.3 | 664 | 0.425 |
| Polyvinylchloride | 0.035 | 0.018 | 0.45 | 10.0 | 660 | 4.145 |

NB: Thickness of fluorescent layer is 300 nm

Dependence of $I_n$ level from the Fluorescent Layer Thickness on PVC (Example # 1)

TABLE #4

| Substrate type/ Ex. #1 | Fluor. layer thick | Absorption $D_1$ | $D_2$ | $D_2/D_1$ | ½ | Fluorescence $\lambda_{flour,}$ (nm) | $I^{rel.}_{fl.}$ |
|---|---|---|---|---|---|---|---|
| PC | 150 | 0.034 | 0.014 | 0.41 | 14.3 | 668 | 1.0 |
| PVC | 150 | 0.038 | 0.016 | 0.43 | 10.3 | 663 | 4.0 |
| PVC | 300 | 0.087 | 0.036 | 0.41 | 10.7 | 661 | 22.5 |
| PVC | 300 | 0.074 | 0.030 | 0.41 | 10.0 | 661 | 21.0 |

Dependence of $I_n$ level from the Fluorescent Layer Thickness on PVC (Examples ## 4 and 5)

TABLE #5

| Ex. # | | Dye concentration Mol/kg | Fluor. layer thickness (nm) | Substrate type | Absorption $D_1$ | $D_2$ | $D_2/D_1$ | ½, nm | Fluorescence $\lambda_{flour,}$ (nm) | $I_{fl.}$ |
|---|---|---|---|---|---|---|---|---|---|---|
| 4 | OX1 + NC | $3*10^{-2}$ | 200 | PVC | 0.044 | 0.034 | 0.76 | 12.2 | 663 | 4.478 |
| 4 | OX1 + NC | $3*10^{-2}$ | 400 | PVC | 0.084 | 0.056 | 0.63 | 10.7 | 662 | 7.145 |
| 4 | OX1 + NC | $3*10^{-2}$ | 500 | PVC | 0.147 | 0.081 | 0.55 | 10.7 | 661 | 13.25 |
| 5 | OX1 + NC | $9*10^{-2}$ | 200 | PVC | 0.177 | 0.089 | 0.47 | 12.9 | 664 | 5.895 |
| 5 | OX1 + NC | $9*10^{-2}$ | 400 | PVC | 0.416 | 0.14 | 0.38 | 10.7 | 667 | 14.7 |
| 5 | OX1 + NC | $9*10^{-2}$ | 500 | PVC | 0.615 | 0.240 | 0.39 | 11.4 | 669 | 7.521 |

Dependence of $I_n$ level from the Polymer Nature and the Fluorescent Layer Thickness (Examples ## 7,8, 10 and 11) (Examples ## 7, 8, 10 and 11)

TABLE #6

| Ex. # | | Dye concentration Mol/kg | Fluor. layer thick (nm) | Substrate type | Absorption $D_1$ | $D_2$ | $D_2/D_1$ | ½, nm | Fluorescence $\lambda_{flour,}$ (nm) | $I_{fl.}$ |
|---|---|---|---|---|---|---|---|---|---|---|
| 10 | HIDC + NC | $3*10^{-2}$ | 200 | PVC | 0.110 | 0.066 | 0.06 | 15.0 | 673 | 5.640 |
| 10 | HIDC + NC | $3*10^{-2}$ | 400 | PVC | 0.219 | 0.106 | 0.48 | 13.6 | 674 | 8.032 |
| 7 | HIDC + PVA | $3*10^{-2}$ | 300 | PC | 0.196 | 0.120 | 0.61 | 17.9 | 665 | 0.378 |

TABLE #6-continued

| Ex. # | | Dye concentration Mol/kg | Fluor. layer thick (nm) | Substrate type | Absorption | | | Fluorescence | | |
|---|---|---|---|---|---|---|---|---|---|---|
| | | | | | $D_1$ | $D_2$ | $D_2/D_1$ | ½, nm | $\lambda_{flour,}$ (nm) | $I_{fl.}$ |
| 11 | HIDC + NC | $9 * 10^{-2}$ | 200 | PVC | 0.296 | 0.148 | 0.50 | 13.9 | 674 | 3.797 |
| 11 | HIDC + NC | $9 * 10^{-2}$ | 400 | PVC | 0.662 | 0.092 | 0.44 | 14.3 | 678 | 11.53 |
| 8 | HIDC + PVA | $9 * 10^{-2}$ | 100 | PC | 0.146 | 0.07 | 0.50 | 15.7 | 672 | 0.228 |

Table 1 illustrates the effect of increasing fluorescence intensity by using a filmmaking polymer, which reduces the ability of cationic dyes to form non-fluorescent dimers and other dye associates. The table, as well as all the tables given below, utilizes the following designations:

$D_1$—optical density of the monomer form in a maxima of absorption;

$D_2$—optical density of associated forms in a maxima of absorption;

$D_1/D_2$—the ratio, describing the ability of the dyes to form associates;

½—half-width of the absorption band on the 0.7 $D_1$ level, describing heterogeneity of the absorption band due to the formation of associates and by-products of the specific reaction between the dyes and the medium;

$\lambda_{fluor}$—maximum of fluorescence;

$I_n$—intensity of fluorescence in relative figures.

As can be seen from Table 1, the increase of Ox-1 concentration causes $I_n$ reduction both in PVA and nitrocellulose, thus increasing of $D_2/D_1$ and ½. In case of exchanging PVA for the nitrocellulose, the total $I_n$ level doubles due to decreased ability of the Ox-1 to form the associates.

Table 2 illustrates the effect of increasing fluorescence intensity by using a primer between the substrate and the active layer, which allows depositing the fluorescent compositions containing solvents aggressive to the substrate. Plotting of a liquid silica glass primer 80 nm thick on a PC substrate allows depositing compositions based on PMMA and PVC, containing methylenechloride and dioxane, which also dissolves the PC substrate.

As can be seen from the Table 2, in the Examples 13 and 14 the fluorescence level increases in 6 and 8 times correspondingly in comparison to the example without the primer (Example 1). Use of primer doubles fluorescence in the Example 1 composition.

Table 3 illustrates the impact of the polymer substrate nature on the fluorescence intensity in the Example 1. The types of substrates are sorted by ascending of fluorescence. As seen, the transition from polypropylene to polyvinylchloride consecutively increases fluorescence, which is maximum for the polyvinylchloride. The consequence for the adhesion of the active layer to the substrate is the same.

The non-cymbate growth of fluorescent signal at increasing the active layer thickness without changing the dye concentration, as shown in the Table 4 with respect to the polymer, testifies that the associated forms of the dye are mostly absorbed on the boundary of the substrate (PCV, in this case) and the active layer. At the same time, the monomeric form of the dye is mostly diluted in the polymeric composition. Due to the same reasons, increasing dye concentration in the active layer bonded on the PVC does not cause depreciation of fluorescence, as in the case of using PC substrate. In some case, we observe even the growth of $I_n$ (compare Tables 5, 6 and 1).

Thus, the proposed ways of increasing fluorescence of the polymeric compositions containing super-high fluorescent dyes (3–20 $10^{-2}$ Mol/kg of polymer) which usually cause rigid depreciation of fluorescence can be used for creation of optical recording media for low-cost CD ROM, DVD and WORM discs with simplified structure and with increased quality and stability of data reproduction at reading by fluorescence.

The greatest strengthening of the fluorescent signal is achieved by using primers (2–8 times increase) and polymer substrate, providing effective absorption of the non-fluorescent associates of the dye molecules on its boundary with the active layer (more than 20 times increase).

What is claimed is:

1. A fluorescent single- or multi-layer optical disc for storing information, the disc comprising at least one information layer, said at least one information layer comprising:
    a transparent film substrate;
    a fluorescent composition covering the transparent film substrate and comprising a fluorescent dye, a film-forming polymer, a plasticizer, a surfactant and a light stabilizer; and
    a primer layer placed between the substrate and the fluorescent composition;
    wherein at least one of the substrate, the fluorescent composition and the primer layer comprises a material providing effective adhesion of the fluorescent composition to the substrate or the primer layer so as to prevent formation on an inter-layer boundary of non-fluorescent poly-molecular associates of fluorescent dyes causing quenching of fluorescence, and
    wherein the dye is present in an amount of 0.1 weight percent to 10 weight percent of the information layer and the plasticizer is present in an amount of 10 weight percent to 50 weight percent of the information layer.

2. The disc of claim 1, wherein the primer comprises a substance selected from the group consisting of liquid silica glass, polyvinyl alcohol, thermosetting resins, polyorganosiloxanes and latexes.

3. The disc of claim 1, wherein the substrate comprises a substance selected from the group consisting of polyvinyl chloride and its co-polymers.

4. The disc of claim 1 wherein the film-forming polymer comprises a substance selected from the group consisting of polyvinyl chloride and its co-polymers, chlorinated polyvinyl chloride and nitrocellulose.

5. The disc of claim 1, wherein the surfactant comprises a substance selected from the group consisting of butyl glycol, propylene glycol, dimethyl glycol and diethyl glycol.

6. The disc of claim 1, wherein the disc is a multi-layer disc having a plurality of said information layers.

7. A method of increasing a fluorescent signal level from a fluorescent single- or multi-layer optical disc for storing information, the disc comprising at least one information layer, said method comprising:
(a) forming said at least one information layer from:
a transparent film substrate;
a fluorescent composition covering the transparent film substrate and comprising a fluorescent dye, a film-forming polymer, a plasticizer, a surfactant and a light stabilizer; and
a primer layer placed between the substrate and the fluorescent composition;
wherein at least one of the substrate, the fluorescent composition and the primer layer comprises a material providing effective adhesion of the fluorescent composition to the substrate or the primer layer so as to prevent formation on an inter-layer boundary of non-fluorescent poly-molecular associates of fluorescent dyes causing quenching of fluorescence,
(b) heating said at least one information layer to a temperature sufficient to improve adhesion of the fluorescent composition to the substrate or primer layer,
wherein the dye is present in an amount of 0.1 weight percent to 10 weight percent of the information layer and the plasticizer is present in an amount of 10 weight percent to 50 weight percent of the information layer.

8. The method of claim 7, wherein step (a) comprises providing a plurality of said information layers such that the disc is a multi-layer disc.

9. The method of claim 7, wherein step (b) comprises heating said information layer to a temperature of 100° C. to 120° C.

10. A fluorescent single- or multi-layer optical disc for storing information, the disc comprising at least one information layer, said at least one information layer comprising:
a transparent film substrate;
a fluorescent composition covering the transparent film substrate and comprising a fluorescent dye, a film-forming polymer, a plasticizer, a surfactant and a light stabilizer; and
a primer layer placed between the substrate and the fluorescent composition;
wherein at least one of the substrate, the fluorescent composition and the primer layer comprises a material providing effective adhesion of the fluorescent composition to the substrate or the primer layer so as to prevent formation on an inter-layer boundary of non-fluorescent poly-molecular associates of fluorescent dyes causing quenching of fluorescence, and
wherein the dye is present in an amount sufficient to provide a transmittance at a wavelength of maximum absorption through the information layer of about 92% to about 96%.

11. The disc of claim 10, wherein the primer comprises a substance selected from the group consisting of liquid silica glass, polyvinyl alcohol, thermosetting resins, polyorganosiloxanes and latexes.

12. The disc of claim 10, wherein the transmittance is 92.3% to about 96%.

13. The disc of claim 10, wherein the transmittance is greater than 92.3% to about 96%.

* * * * *